Patented May 12, 1936

2,040,212

UNITED STATES PATENT OFFICE 2,040,212

WATER-SOLUBLE CONDENSATION PRODUCTS

Ludwig Orthner, Leverkusen-I. G. Werk, and Arnold Doser, Cologne-Mulheim, Germany, assignors to I. G. Farbenindustrie Aktiengesellschaft, Frankfort-on-the-Main, Germany No Drawing. Application November 9, 1934, Serial No. 752,370. In Germany November 18, 1933

11 Claims. (Cl. 260—2)

The present invention relates to the manufacture of new water-soluble condensation products.

According to this invention, the new products are obtained by treating with sulfonating agents the condensation products of high molecular alkali-soluble substances containing phenolic hydroxyl groups with reactive derivatives of polyvalent alcohols such as alkylene oxides and the corresponding mineral acid esters. The starting materials and the reaction itself being of a very complex nature, no exact formula can be given for the resulting products.

The following alkali-soluble substances containing phenolic hydroxyl groups, after condensation with an alkylene oxide or a corresponding mineral acid ester, may be used as starting material for the present process: synthetic resins as can be obtained by condensing phenols with aldehydes, if desired in combination with urea, thiourea, arylsulfamides or phenol sulfonic acids; the condensation products of phenols alone or in the presence of aldehydes, or if desired, urea with resin acids or derivatives thereof or other carboxylic acids and glyptals; the resinous extracts from vegetable tanning materials containing phenolic groups such as quebracho extract; moreover, such resins as are obtainable from phenols by reacting therewith sulfur, sulfur halides, unsaturated high molecular fatty acids or unsaturated hydrocarbons such, for instance, as acetylene or butadiene hydrocarbons. On the other hand, as alkylene oxide components of the starting materials there may be mentioned for instance: ethylene oxide, propylene oxide, butylene oxide, glycide or mixtures thereof, as well as the corresponding mineral acid esters of polyvalent alcohols such, for instance, as the alkylene hydrins and the epihalogen hydrins.

By selecting the starting materials with a view to the condensation degree of the phenol resins and the quantity of the alkylene oxide reacted therewith as well as by choosing suitable conditions for the sulfonation, the properties of the sulfonation products can be varied to a certain degree. For example, the resins prepared by using a small amount of ethylene oxide, which are still completely insoluble in water, can be rendered more or less water-soluble by sulfonation at usual temperatures of 60–80° C., whereas condensation products reacted with a larger amount of alkylene oxide can be sulfonated to form water-soluble products even more easily; finally, such starting materials as contain still more of the alkylene oxide component and thereby have become soluble in cold water, but are still insoluble in hot water, can be sulfonated under very mild conditions yielding products which are soluble also in hot water.

The sulfonation process itself is performed easily and extremely quickly. In order to obtain products which are soluble in water, it is sufficient in several cases to use sulfuric acid of medium strength, for instance 60–66° Bé., the temperature being not higher than 20–30° C. The sulfonation can also be carried out in the presence of solvents such, for instance, as glacial acetic acid or phosphoric acid, but in many cases the use of solvents is not at all necessary. However, also stronger sulfonation agents such, for instance, as monohydrate, oleum or chlorsulfonic acid may be applied, and the reaction may then be performed at lower temperatures and/or in the presence of diluents.

In accordance with the process of the present invention, light colored products of high technical value are obtained without any difficulty. It is a particular advantage of the present process that the properties of the resulting products can be varied within wide limits. Hence it is possible to manufacture suitable products for the various purposes of technical application. If desired, the reaction products can be after-treated with condensing agents such, for instance, as formaldehyde.

The new products possess a good affinity to the animal fibre and an excellent dispersing power. Therefore, they can be advantageously employed in the textile industry, for instance as dispersing agents for all kinds of pigments, as stabilizing agents for vat dyestuff or diazo solutions and as leveling agents particularly in the vat dyeing process. Some of the products, particularly those derived from phenol-aldehyde and phenol-resinous acid resins, are very suitable as tanning agents in the leather industry. For all these purposes, the products may also be applied in combination with each other or with other auxiliary agents.

We wish it to be understood that by the term "sulfonate" in all its forms as used throughout this specification and the following claims we intend to cover the formation of sulfonic acid as well as of sulfuric acid ester groups, but without at the same time introducing organic radicals therein.

The following examples illustrate the invention, the parts being by weight:—

*Example 1*

(a) 44 parts of a 33% sodium hydroxide lye are stirred at 80–90° C. into a melted resin prepared in accordance with German Patent 219,728 from 94 parts of phenol and 86 parts of a 30% aqueous solution of formaldehyde. Ethylene oxide is then introduced into the alkaline solution until the weight has increased for 36 parts. Without removing the water, 55 parts of sulfuric acid of 60° Bé. and 240 parts of sulfuric acid of 66° Bé. are gradually stirred into the solution, the temperature being maintained at between 80–90° C. During the sulfonation, part of the water is evaporated in vacuo at the same temperature until a test portion taken from the reaction mixture is soluble in five to ten times its weight of water. Then, the mixture is introduced into water, and the reddish reaction product is precipitated thereby. After separating from the acid liquor, the product is dissolved in water, neutralized with ammonia and, on adding traces of sodium bisulfite, separated by adding an aqueous solution of sodium chloride. After drying, a colorless powder is obtained, which is easily soluble in water. Weakly acid solutions thereof effect coagulation of glue.

(b) Instead of 36 parts of ethylene oxide, 88 parts are introduced, and the reaction mixture is treated in the manner described above with 165 parts of sulfuric acid of 66° Bé. at 70° C. and worked up. An almost colorless powder of similar properties is obtained.

(c) If the resin is treated with 161 parts of ethylene oxide instead of with 36 parts, the reaction mixture can be converted after drying in vacuo into a very easily water-soluble product by treating with only 70 parts of sulfuric acid of 66° Bé. at 60–65° C. The products can be separated from its aqueous solution in an oily condition by adding sodium chloride; it has dispersing power, and its coagulating capacity for glue is weak.

It is also possible to make the ethylene oxide resins water-soluble by dissolving them in glacial acetic acid and treating them with monohydrate, fuming sulfuric acid or chlorsulfonic acid; temperatures of 20–40° C. are sufficient.

*Example 2*

33 parts of a 33% sodium hydroxide lye are stirred at 70–80° C. into a melted resin prepared in accordance with German Patent 219,728 from 100 parts of o-cresol and 80 parts of a 30% aqueous solution of formaldehyde. Ethylene oxide is then introduced into the alkaline solution until the weight has increased for 30 parts. 85 parts of sulfuric acid of 60° Bé. and 180 parts of sulfuric acid of 66° Bé. are gradually stirred into the solution, the temperature being still maintained at 70° C. for one hour. A test portion washed free from acid, will then be water-soluble. The reaction product can be worked up in the manner described in Example 1. If a larger amount of sulfuric acid is applied, for example 370 parts of 66° Bé., the product obtained is still more easily soluble and more stable to salts. It coagulates glue; from an acid bath, it goes on wool, reserving the same.

*Example 3*

70 parts of a product obtained in accordance with Example 1 (a) are dissolved in 300 parts of water. 5 parts of a 30% aqueous solution of formaldehyde and 5 parts of 10-n-sulfuric acid are added. The mixture is then heated for 3½ hours in a boiling water bath under reflux. The formaldehyde is gradually consumed, and the liquid grows slightly opalescent. After neutralizing the sulfuric acid, a solution is obtained which is thinly liquid at higher temperatures and which, at ordinary temperature, solidifies to form a solid mass. A 10% solution is still viscous at lower temperatures and is of about the same consistency as a 30% solution of a product not treated with formaldehyde. The product coagulates glue.

*Example 4*

An alkali soluble resin is prepared from 94 parts of phenol, 117 parts of a 30% aqueous solution of formaldehyde, 19.4 parts of urea and 2.5 parts of 40% sulfuric acid by heating the solution of these starting materials to 85° C. for 4½ hours under reflux. The resin separated is brought into solution at 90–95° C. by stirring with a mixture of 50 parts of 33% sodium hydroxide lye and 40 parts of water. Ethylene oxide is then introduced at 70–80° C. until the weight has increased for 58 parts. The reaction product is treated at 60° C. with 350 parts of sulfuric acid of 66° Bé. until a test portion washed free from acid is easily water-soluble. The sulfonation mixture is then, while stirring, poured on ice water, and separates as a solid mass. The liquid is sucked off, the product washed with a small amount of cold water, dissolved in hot water and the solution neutralized with sodium hydroxide lye. After evaporation to dryness, a light brown product is obtained, which is easily soluble in water; weakly acid solutions thereof coagulate glue. Instead of phenol, the equivalent amount of o-chlorphenol may be employed; the product thus obtained is not so easily soluble in water.

*Example 5*

900 parts of colophony are heated for 10 hours with 450 parts of crude cresol to which 42 parts of sulfuric acid of 60° Bé. are added as condensing agent. A brownish, alkali-soluble resin is obtained, which is brought into solution with the aid of 730 parts of 16.5% sodium hydroxide lye. 133 parts of this solution are treated at 60–70° C. with ethylene oxide until the weight has increased for 20 parts; no alteration of the solution is visible during this treatment. 290 parts of sulfuric acid of 66° Bé. are gradually stirred into the solution during one hour at 40–50° C. The resin is dissolved with a brown-red coloration. The temperature is maintained at 45° C. for one hour. The solution is then allowed to cool. 18 hours later, the solution is introduced into a mixture of ice and water; the reaction product separates as a solid, brown mass. The liquid is sucked off and the product is washed with a small amount of cold water and dissolved in warm water. The solution is then neutralized with sodium hydroxide lye. 1–2 parts of sodium bisulfite are added. The product is salted out and dried. A yellow powder is obtained, which is easily soluble in water. Acid solutions thereof coagulate glue and reserve wool.

If the alkaline resin solution is treated with 30 parts of ethylene oxide, the reaction product can be sulfonated already at 30° C., whereas the resin which has not been treated with ethylene oxide can be sulfonated only incompletely even at 100° C. yielding a dark brown product.

A resin obtained from 100 parts of colophony and 300 parts of crude cresol behaves similarly on sulfonation, and the products obtained exhibit similar properties.

*Example 6*

150 parts of a colophony cresol resin prepared in accordance with Example 5 are stirred at slightly elevated temperatures with 14 parts of a 33% sodium hydroxide lye. The water is evaporated in vacuo. The resin is melted at 120° C. and ethylene oxide is introduced. Thereby, the mass grows more and more thinly, so that the temperature can be lowered to 60–70° C. The introduction of ethylene oxide is continued until the weight has increased for 260 parts. The product thus obtained is easily water-soluble at lower temperatures. On warming, the aqueous sollution thereof becomes turbid with little drops of oil; on allowing the solution to cool, it turns clear again.

240 parts of sulfuric acid of 63° Bé. are gradually stirred into 120 parts of the products obtained, the temperature being 30–40° C. A test portion taken will then be clearly soluble even in hot water. The reaction product is introduced into a solution of sodium chloride. It separates in an oily condition. The separated oil is neutralized with dilute sodium hydroxide lye. The product obtained possesses a very good dispersing capacity for calcium soaps.

*Example 7*

In accordance with German Patent 219,728, a resin is prepared by a twelve hours' heating of 470 parts of phenol, 430 parts of a 30% aqueous solution of formaldehyde and 27 parts of ammonium chloride. The resin obtained is treated with steam for seven hours. A mass is obtained which is solid and brittle at lower temperatures and soft and plastic at about 35° C.; it is not sticky. By stirring with 186 parts of 38% sodium hydroxide lye, it is brought into solution. Ethylene oxide is introduced into the solution at 80–90° C. until the weight has increased for 220 parts. 200 parts of sulfuric acid of 66° Bé. are stirred into the solution at 85–95° C. The sulfonation mass is stirred in vacuo as long as a homogeneous solution is obtained. The solution is poured into 6000 parts of water. The reaction product is salted out and dissolved in warm water. The solution is neutralized and evaporated to dryness. The product obtained can be employed alone or in combination with other similarily acting substances as dispersing agent for vat dyestuffs.

*Example 8*

100 parts of colophony, 50 parts of crude cresol and 7.5 parts of sulfuric acid of 60° Bé. are heated for ten hours to 70–80° C. 7 parts of powdered sodium hydroxide are added, and ethylene oxide is introduced until the weight has increased for 165 parts. 290 parts of monohydrate are added to the condensation product at 50–60° C. and the mixture is stirred for one hour. The sulfonation mass is then stirred into 1000 parts of a semi-saturated solution of sodium chloride. The reaction product is separated from the lower watery layer and neutralized with sodium hydroxide lye. The product is then again washed out with 200 parts of a saturated solution of sodium chloride. By diluting with water, a 40% solution is prepared, which is thinly liquid at elevated temperatures and thickly liquid at lower temperatures. It possesses a good dispersing capacity for vat dyestuffs.

*Example 9*

80 parts of colophony, 40 parts of phenol and 5.8 parts of sulfuric acid of 60° Bé. are heated to 70–80° C. for ten hours. With the condensation product obtained are incorporated 20 parts of 38% sodium hydroxide lye. 50 parts of glycide are added drop by drop during two hours at 75–80° C. After stirring for one hour, 275 parts of sulfuric acid of 66° Bé. are gradually added. Some hours later, the reaction mixture is worked up in the manner described in Example 5. The powder obtained is water-soluble and of a weak yellow color. Acid solutions thereof coagulate glue.

*Example 10*

320 parts of a phenol sulfur resin prepared in accordance with German Patent 572,361 (Example 1) are dissolved in 150 parts of hot water and 7 parts of 3% sodium hydroxide lye. Ethylene oxide is introduced into the solution at 70–80° C. until the weight has increased for 88 parts. 550 parts of sulfuric acid of 66° Bé. are stirred into the reaction product at 80–90° C. The water is evaporated in vacuo, and 180 parts of sulfuric acid of 66° Bé. and 184 parts of monohydrate are added. A green sulfonation lye is obtained, from which the water-soluble sodium salt of the sulfonation product can be isolated in the known manner. Acid solutions thereof coagulate glue.

*Example 11*

108 parts of crude cresol, 100 parts of a 30% aqueous solution of formaldehyde, 68 parts of p-toluenesulfamide and 22 parts of a 4% sulfuric acid are heated to 96° C. for one hour. The resin obtained is treated with steam for one hour. It is then separated from the watery layer. 20 parts of a 38% sodium hydroxide lye are then added to the reaction mass at 60–70° C. During 1½ hours, 81 parts of glycolchlorhydrin are gradually stirred into the clear red-brown solution obtained, keeping the reaction mixture distinctly triazene-alkaline by simultaneously adding a 38% sodium hydroxide lye. Finally, the mixture is heated to 90–95° C. for some time and allowed to cool without stirring. It is then separated from the upper watery layer formed. 200 parts of sulfuric acid of 66° Bé. are then stirred into the reaction product at 65–70° C. A test portion taken from this mixture is soluble in about ten times its quantity of water. The sodium salt of the sulfonic acid is obtained in the known manner. After drying and powdering, a powder of a weak grey color is obtained. It is soluble in water with a yellowish coloration. Weakly acid solutions thereof coagulate glue.

*Example 12*

A resin obtained in the manner described in Example 11 from 108 parts of crude cresol, 100 parts of a 30% aqueous solution of formaldehyde and 68 parts of p-toluenesulfamide is stirred with 16 parts of a 30% sodium hydroxide lye. Ethylene oxide is introduced into the weakly alkaline solution at 70° C. until the weight has increased for 22 parts. The reaction product is then stirred at 70–80° C. with 200 parts of sulfuric acid of 66° Bé. The mixture is heated in vacuo to 75–80° C. until a test portion is soluble in ten times its weight of hot water. The sulfonation mass is introduced into 1000 parts of water, and the reaction product is separated from the watery layer, pasted with 1000 parts of water and neutralized with ammonia. After cooling, the neutralized product is separated from the salt solution, dried and powdered. An almost colorless water-soluble powder is obtained. Weakly acid solutions thereof coagulate glue.

Example 13

475 parts of the black lye obtained in the sulfate boiling process of the paper industry are gradually introduced, for the purpose of purification, into 250 parts of an 18.5% hydrochloric acid. The product separated is filtered with suction and washed. The residue (210 parts) is stirred on a boiling water bath with 45 parts of a 38% sodium hydroxide lye. A dark brown, thinly liquid solution is obtained, which is evaporated to 180 parts and treated at 80–90° C. with ethylene oxide until the weight has increased for 60 parts. 300 parts of sulfuric acid of 66° Bé. are gradually added at 50° C., and the reaction mass becomes water-soluble. By separation with the aid of lime or soda, or by evaporation to dryness, a resinous product is obtained, which is soluble with a brown coloration. It is soft at slightly elevated temperatures. Acid solutions thereof coagulate glue.

Example 14

A solution of 300 parts of phenol in 300 parts of linseed oil is treated with 360 parts of sulfuric acid (specific gravity 1,30) for twenty hours, while intensely stirring. The superfluous phenol is removed by distillation with steam.

50 parts of the condensation product are rendered weakly alkaline by the addition of 2.2 parts of a 38% sodium hydroxide lye. The water is removed at 95° C. and 13 mm. pressure. Ethylene oxide is introduced at 80–90° C. until the weight has increased for 13 parts. The reaction product is treated with 100 parts of sulfuric acid of 66° Bé. at 40–50° C. and thus rendered easily water-soluble. The sodium salt is obtained by pouring the sulfonation mass into water, taking up the reaction product with butyl alcohol, neutralizing with sodium hydroxide lye and evaporating the solvent. The sodium salt does not become solid and is easily water-soluble. A solution of 1 part of the sodium salt in water of 18° German hardness remains clear on the addition of 28 parts of a 38% sodium hydroxide lye, even after one hour's heating to 70° C.

Example 15

330 parts of a condensation product prepared in accordance with German Patent 536,550 from wood oil and phenol are stirred with 68 parts of a 38% sodium hydroxide lye and treated with ethylene oxide until the weight has increased for 60 parts. 600 parts of sulfuric acid of 66° Bé. are stirred into the reaction product at 40–50° C. A test portion taken is water-soluble. After 12 hours, the product is worked up in the known manner. The sodium salt is easily water-soluble and possesses similar properties as that obtained in accordance with Example 14.

Example 16

132 parts of ethylene oxide are reacted upon 214 parts of phenol acetylene resin at 160° C. and 12 at. pressure, while adding 0.8 parts of sodium hydroxide. A semi-solid, water-insoluble, resin-like condensation product is obtained, which is then converted into a water-soluble product by treating it with 280 parts of concentrated sulfuric acid at 60–70° C. The sulfonation product obtained is then neutralized with sodium hydroxide lye and salted out from the aqueous solution formed as a semi-solid mass. By drying in vacuo at ordinary temperature, the sulfonation product is obtained as a brittle, yellow brown resin, which is advantageously employed in the textile industry and particularly as an equalizing agent for dyeing with colors which are difficultly to be equalized.

We claim:—

1. The process which comprises sulfonating a condensation product of resinous alkali-soluble substances containing phenolic hydroxyl groups being selected from the group consisting of condensation products of phenols and resinous extracts from vegetable tanning materials with reactive derivatives of polyvalent alcohols, the said derivatives being selected from the group consisting of halogenhydrins and alkylene oxides.

2. The process which comprises sulfonating a reaction product of alkali-soluble condensation products from phenols and aldehydes with reactive derivatives of polyvalent alcohols, the said derivatives being selected from the group consisting of halogenhydrins and alkylene oxides.

3. The process which comprises sulfonating a reaction product of alkali-soluble condensation products from phenols, urea and formaldehyde with reactive derivatives of polyvalent alcohols, the said derivatives being selected from the group consisting of halogenhydrins and alkylene oxides.

4. The process which comprises sulfonating a reaction product of alkali-soluble condensation products from phenols and colophony with reactive derivatives of polyvalent alcohols, the said derivatives being selected from the group consisting of halogenhydrins and alkylene oxides.

5. The composition of matter comprising a sulfonated reaction product of alkali-soluble condensation products containing phenolic hydroxyl groups with reactive derivatives of polyvalent alcohols, the said derivatives being selected from the group consisting of halogenhydrins and alkylene oxides.

6. The composition of matter comprising a sulfonated reaction product of alkali-soluble condensation products from phenols and aldehydes with reactive derivatives of polyvalent alcohols, the said derivatives being selected from the group consisting of halogenhydrins and alkylene oxides.

7. The composition of matter comprising a sulfonated reaction product of an alkali-soluble condensation product from phenol and formaldehyde with ethylene oxide, the said sulfonated condensation product being a lightly colored water-soluble substance which is especially suitable as a dispersing agent and furthermore, a levelling agent in the dyeing of textiles.

8. The composition of matter comprising a sulfonated reaction product of alkali-soluble condensation products from phenols, urea and formaldehyde with reactive derivatives of polyvalent alcohols, the said derivatives being selected from the group consisting of halogenhydrins and alkylene oxides.

9. The composition of matter comprising the sulfonated reaction product of an alkali-soluble condensation product from phenol, urea and formaldehyde with ethylene oxide, the said sulfonated condensation product being a lightly colored water-soluble substance which is especially suitable as a dispersing agent and furthermore, a levelling agent in the dyeing of textiles.

10. The composition of matter comprising a sulfonated reaction product of alkali-soluble condensation products from phenols and colophony with reactive derivatives of polyvalent alcohols, the said derivatives being selected from the group consisting of halogenhydrins and alkylene oxides.

11. The composition of matter comprising a sulfonated reaction product of an alkali-soluble condensation product from crude cresol and colophony with less than two molecular proportions of ethylene oxide per each phenolic hydroxyl group, the said sulfonated condensation product being a lightly colored substance which is especially suitable as a tanning agent.

LUDWIG ORTHNER.
ARNOLD DOSER.